3,779,985
STABILIZATION OF FLUORINE-CONTAINING VINYL POLYMERS
Gunther Heuser, Troisdorf-Oberlar, Gregor Weisgerber, Konigswinter, and Erich Behr, Troisdorf, Germany, assignors to Dynamit Nobel AG, Troisdorf, Germany
No Drawing. Filed Sept. 22, 1971, Ser. No. 182,864
Claims priority, application Germany, Nov. 30, 1970,
P 20 58 823.2
Int. Cl. C08f 45/58
U.S. Cl. 260—45.95 R              5 Claims

ABSTRACT OF THE DISCLOSURE

Improved heat stabilization and ultraviolet light stabilization for fluorine-containing vinyl polymers such as polyvinyl fluoride by the admixture with such polymers of a mixture of a polyol, a polynuclear phenol and an hydroxy benzophenone. It is preferred to establish the stabilizer mixture of 0.15 to 1.0 weight percent of the polyol, 0.05 to 0.5 weight percent of the polynuclear phenol, and 0.3 to 1.0 weight percent by weight of the hydroxy benzophenone, each related to the polymer being stabilized. The proportion of stabilizer as a whole is 0.1 to 5.0 percent by weight related to the polymer weight.

---

This invention relates to the stabilization of fluorine-containing vinyl polymers against high temperature oxidation under conditions encountered during the manufacturing and processing operations of such polymers. It more particlarly refers to additionally protecting such polymers to a greater extent than hitherto known against discoloration due to light.

It is known that halogen-containing vinyl polymers are subject to undesirable discolorations as a result of the action of heat or light. In particular, subjecting such polymers to elevated temperatures causes partial decomposition thereof, resulting in a red-brown to black discoloration of the polymer.

It is known that this decomposition can be retarded by adding stabilizers. A number of compounds of various classes of substances are known for stabilizing chlorine-containing polymers against the otherwise ill effects of processing temperatures required for chlorine-containing vinyl compounds. Examples of such stabilizers are: inorganic compounds such as oxides, hydroxides, carbonates, phosphates and phosphites of the alkali and alkaline earth metals, as well as, e.g., zinc, cadmium, lead or antimony; furthermore organometallic compounds, mainly those of tin, e.g., alkyl tin mercaptides, alkyl tin maleate, furthermore metal salts of fatty acids, epoxidized under certain circumstances. Organic compounds are also known as stabilizers for chlorine-containing vinyl polymers, such as, e.g., urea and thiourea derivatives, amino crotonic acid esters, carboxylic acid hydrazides and epoxy compounds. In addition, phosphites and phenols, as well as ultraviolet light absorbers are used.

The processing of fluorine-containing vinyl polymers calls for higher processing temperatures than that of analogous chlorine-containing vinyl polymers. These temperatures may reach as high as 250° C. Under these circumstances the thus processed fluorine-containing polymers are known to very rapidly show initial red-brown discoloration during processing. Due to these high processing temperatures, nearly all stabilizers known for the stabilization of, for instance, polyvinylchloride, have been found to be ineffective because they cannot meet these increased requirements.

The use of di- or tripentaerythritol and sorbitol to stabilize polyvinyl fluoride is already known from U.S. Pat. 3,429,844. Unfortunately, the stabilizing effect of these compounds does not suffice for many applications of polyvinyl fluoride. It is known, however, to stabilize polyvinyl fluoride by using mixtures of these polyols, phenols and organic phosphites (German Auslegschrift 1,802,659). Such stabilizing mixtures provide effectively stable polymers which may be processed in suitable compositions and mixtures at temperatures between 165 and 205° C. without appreciable decomposition. However, at higher temperatures, the polymers stabilized in this manner withstand decomposition only for a short period of time. A polyvinyl fluoride stabilized with 3.0 weight percent of the combination of tripentaerythritol, 2,6-di-tert-butyl-p-cresol and tridecyl phosphite remains stable for only 35 minutes at temperatures of 260° C.

Another drawback of this known combination is that it is not suitable to adequately stabilize polymers that have intrinsic viscosities of more than about 100. Such polymers frequently call for processing temperatures of about 250° C. If, for instance, a mixture of 2,6-di-tert-butyl-p-cresol and tridecyl phosphite is added to such polymers, heavy smoke development occurs in a rolling operation even in a temperature range of 210 to 220° C., thus for all practical purposes, excluding the use of this combination for stabilization at even higher elevated temperatures.

It is therefore an important object of this invention to provide an improved stabilized fluorine containing vinyl polymer.

It is another object of this invention to provide a novel thermal oxidation and ultraviolet light stabilizer.

Other and additional objects of this invention will become apparent from a consideration of this entire specification, including the claims hereof.

In accord with and fulfilling these objects, one aspect of this invention resides in a novel stabilizer for fluorine-containing vinyl polymers comprising a stabilizing amount of a mixture of a polyol, a polynuclear phenol and an hydroxybenzophenone.

The fluorine-containing vinyl polymers stabilized according to the invention do not show the drawbacks of the polymers treated with the stabilizers or stabilizer combinations hitherto known or show them only to a minor degree. Thus, they can withstand temperatures up to 250° to 260° C. for more than one hour without appreciable decomposition. A stability of this duration could not be achieved with stabilizers known prior to this invention.

The fluorine-containing vinyl polymers stabilized according to the invention further withstand the action of light and other atmospheric influences to a far greater extent than do polymers stabilized with the hitherto known stabilizers. The criterion for the stability with respect to these atmospheric influences is the ultraviolet stability test wherein rolled sheet samples are molded into sheets of 0.2 mm. thickness and cut-out samples thereof are irradiated with ultraviolet radiation in an apparatus with a type S 500 lamp, output 500 watts, at an irradiation distance of 45 cm. The grading was done by evaluating the samples at intervals of 24 hours each within a characteristic number range from 0 to 4, 0 meaning unchanged, 1 first changed, 2 light, 3 medium and 4 strong discoloration.

Vinyl fluoride polymers, which had been stabilized with a combination of polyols and phenols, as is known in the art, were subjected to the UV-test. They showed color changes after only 24 hours. It is, of course, possible to prevent discolorations caused by UV-light by adding known UV-absorbers such as benzophenone derivatives, benzene triazol, salicylates, hexamethyl phosphorus triamide or organometallic compounds. If, however, a heat stabilization is to be achieved at the same time in polyvinyl fluoride, the addition of UV-absorbers alone does not suffice, but the utilization of phenols has to be resorted to.

The addition of hydroxybenzophenones to a stabilzer combination of polyols and polynuclear phenols results, in an unexpected manner, in an excellent synergistic effect with respect to both heat stabilization and UV-stabilization so that the flourine-containing vinyl polymers stabilized according to the invention can be exposed to temperatures of 240° C. for more than 2 hours without a red-brown discoloration occurring and maintain their original color in the UV-test over a period of several days.

As a result of adding hydroxybenzophenones, it is furthermore possible to reduce the proportion of phenols in the stabilizer combination of polyol and phenol, which, as such, provides for good heat stabilization, whereby nevertheless achieving a better heat stabilization than with the aforementioned two-component combination.

Quantities of 0.1 to 5 weight percent of the combination, related to the polymer, are sufficient to adequately stabilize the fluorine-containing vinyl polymers. The amount of the constituents of the stabilizer preferably should be 0.15 to 1.0 weight percent polyol, 0.05 to 0.5 weight percent phenol, and 0.3 to 1% hydroxybenzophenone, all related to the polymer. The smaller the quantity of the phenols, the larger the quantity of the hydroxybenzophenones has to be, since the latter enhances the effect of the phenols synergistically.

The polyols suitable in accordance with the invention comprise mainly aliphatic polyvalent alcohols such as pentaerythritol, di- and tripentaerythritol, sorbitol or mannitol.

Polynuclear phenols are intended to mean, in accordance with the invention, preferably those polynuclear phenols which have a stable bridge linkage and where at least one ortho-position to the phenolic hydroxyl group is unoccupied. Bridge linkages can be either direct, such as, e.g., in the dihydroxydiphenyls, or via alkylene bridges or via a —$CR^1R^2$—bridge, wherein $R^1$ and $R^2$ are the same or different alkyl or aryl radicals or H. Examples of such polynuclear phenols are: 4,4'-dihydroxydiphenyl-methane, 4,4'-dihydroxytetraphenylmethane, 2,2' - bis'(4-hydroxyphenyl)ethane, 2,2'-bis(4-hydroxyphenyl)-propane. The phenol radicals may also be linked via an —S— or —$SO_2$— bridge, such as e.g., in 4,4'-thiobis-(m-cresol) or 4,4'-dihydroxydiphenylsulfone. The selection of the appropriate polynuclear phenol also depends upon its decomposition temperature. Only those polynuclear phenols can be used advantageously which do not decompose at the desired processing temperatures of the fluorine-containing vinyl polymers.

The hydroxybenzophenones, which synergistically enhance the effect of the polyol/polynuclear phenols combination, comprise both non-substituted and substituted hydroxybenzophenones. If several hydroxyl groups are present, part of these hydroxyl groups may be etherified. The ether group is preferably one that has 1 to 4 C-atoms and may be straight-chained or branched. Examples for this class of compounds are: 2,4-dihydroxybenzophenone, 2-hydroxy - 4 - methoxy-benzophenone, 2,2'-dihydroxy-4-methoxybenzophenone, 2,2' - 4,4' - tetrahydroxybenzophenone.

The compounds to be stabilized comprise homopolymers and copolymers of vinyl fluoride, as well as combinations of fluorine-containing polymers with other known polymers, which combinations consist of more than 50 weight percent of polyvinyl fluoride. Suitable copolymers of vinyl fluoride are all polymers obtained from vinyl fluoride and all olefinically unsaturated compounds copolymerizable with vinyl fluoride. Such unsaturated compounds are, inter alia, hydrocarbons, halogenated hydrocarbons, unsaturated carboxylic acid derivatives, vinyl esters and vinyl ethers. Examples are: ethylene, propylene, vinylidene fluoride, tetrafluoroethylene, trifluorochloroethylene, hexafluoropropylene, fumaric acid esters, maleic acid esters, acrylic acid esters, methacrylic acid esters, itaconic acid esters, vinyl acetate, vinyl propionate, vinyl pivalate.

Polymer mixtures, in which the stabilizers according to the invention may be used, comprise, for instance, combinations of polyvinyl fluoride and the following polymers: polymers of acrylic acid or its esters, which may be α-alkyl substituted under certain circumstances, either in pure form or copolymerized with styrene or other α-alkyl substitutesd acrylic acid esters, or polymers obtained by graft copolymerization of acrylonitrile and styrene onto butadiene polymers, or copolymers of ethylene and vinyl acetate. Other compositions, which contain more than 50 weight percent of fluorine-containing vinyl polymers, may however also be stabilized in the same manner in accordance with the invention.

The stabilizer mixture is added either by blending with the polymer in powder form or by wetting the polymer with a solution of the stabilizer components in a solvent in which the polymer itself is not soluble, and subsequent evaporating of the solvent.

In order to test the effectiveness of the stabilizer compositions according to the invention, polyvinyl fluoride or copolymers of vinyl fluoride were mixed with the stabilizer components hereof in powder form and subsequently homogenized for 10 minutes on a roller at 220° C. Samples of the rolled sheet, of approximately 0.7 mm. thickness, were exposed to 240° C. for a period of 2 hours in a heating chamber test. The samples were evaluated with respect to their discolorations at intervals of 15 minutes. The discolorations were graded from 1 to 10, the number 1 representing no discoloration, numbers 2 to 6 characterizing an increasing yellow discoloration, numbers 7 to 9 an increasing red-brown discoloration, and number 10 a black discoloration. Up to number 6 the polymer is considered to be sufficiently stabilized, whereas of number 7 a marked decomposition can be found evidenced by the red-brown discoloration. The table below lists the time in minutes, during which the material is stable, i.e., has up to characteristic number 6, and following which, after 15 minutes, red-brown discoloration occurs.

The following example are non-limiting but are only illustrative of the practice of this invention.

EXAMPLE 1

100 g. of polyvinyl fluoride, intrinsic viscosity 90, were dry-mixed with the components of a stabilizer system consisting of 0.3 g. of sorbitol, 0.1 g. of 4,4'-dihydroxytetraphenylmethane and 0.5 g. of 2,4-dihydroxybenzophenone and homogenized on the roller at 220° C. for 10 minutes. Samples of the rolled sheet do not show any red-brown discoloration in the heating chamber test at 240° C. for 2 hours. In the UV-test the first visible discoloration occurs after 120 hours.

EXAMPLE 2

100 g. of a copolymer of polyvinyl fluoride containing 10% copolymerized vinyl acetate, intrinsic viscosity 80, are treated with the same amounts by weight of the individual components of the stabilizer system as in Example 1 and molded as set forth in Example 1. The heating chamber test shows that after 2 hours at 240° C. there is no red-brown discoloration. In the UV-test the first visible discoloration occurs after 96 hours.

EXAMPLE 3

100 g. of a copolymer of polyvinyl fluoride containing 20% copolymerized vinylidene fluoride, intrinisic viscosity 96, are treated with the components of the stabilizer system consisting of 0.3 g. of tripentaerythritol, 0.1 g. of 4,4'-dihydroxytetraphenylmethane and 0.5 g. of 2,2',4,4'-tetrahydroxybenzophenone according to Example 1. The heating chamber test shows that at the end of 2 hours at 240° a red-brown discoloration has not yet occurred. In the UV-test the first visible discoloration occurs after 96 hours.

EXAMPLES 4 TO 18

The table below illustrates the synergistic effect of the stabilizer combination according to the invention (Examples 1, 14 and 15) compared to the known stabilizer systems comprising two of these components. Example 4 lists the values for a non-stabilized polyvinyl fluoride. Examples 5 and 6 show polyvinyl fluoride stabilized according to U.S. Pat. 3,429,844. Example 18 showed stabilization with a combination according to German Auslegeschrift 1,802,659. Other comparison examples show the effect of the individual components, either alone or in a two-component combination. The table shows clearly that the combination according to the invention constitutes a marked improvement compared to all other stabilizers, alone or as two-component combination.

The samples used for the values given in the table were made with a polyvinyl fluoride in accordance with Example 1, which had an intrinsic viscosity of 96.

about 0.05 to 0.5 weight percent, said hydroxybenzophenone present in a proportion of about 0.3 to 1.0 weight percent, each based upon the quantity of fluorine-containing polymer.

2. A composition according to claim 1 wherein said polyol is present in an amount between 0.3 and 1.0 weight percent; said polynuclear phenol is present in an amount between 0.2 and 1.5 weight percent and said hydroxybenzophenone is present in an amount between 0.2 and 0.5 weight percent.

3. A stabilized composition according to claim 1 wherein said polymer is a homopolymer or copolymer of vinyl fluoride.

4. A composition according to claim 3 wherein said polyol is sorbitol and is present in an amount of 0.3 weight percent based upon the weight of fluorine-containing polymer, said polynuclear phenol is 4,4'-dihydroxytetraphenyl methane and the same is present in an amount of 0.1 weight percent based upon the weight of fluorine-containing polymer and said hydroxybenzophenone is 2,4-dihydroxybenzophenone and is present in

TABLE

| Ex. | Polyol | Phenol | Hydroxy benzo-phenone | Polyol | Phenol | Hydroxy benzo-phenone | Heating chamber test at 240° C. stabilizing time (min.) | UV test Time (hrs.) | Characteristic number |
|---|---|---|---|---|---|---|---|---|---|
| 4 | | | | | | | <15 | 24 | ¹2 |
| 5 | A | | | 1.0 | | | 45 | 24 | 3 |
| 6 | B | | | 1.0 | | | 60 | 24 | 4 |
| 7 | | C | | | 0.5 | | 45 | 24 | ²2–3 |
| 8 | A | C | | 0.5 | 0.2 | | 60 | 24 | 3 |
| 9 | B | C | | 0.5 | 0.2 | | 105 | 24 | 4 |
| 10 | B | D | | 0.5 | 0.2 | | 90 | 24 | 4 |
| 11 | B | E | | 0.5 | 0.2 | | 45 | 24 | 4 |
| 12 | | | F | | | 0.5 | <15 | 24 | ²1 |
| 13 | B | | F | 0.5 | | 0.2 | 15 | 24 | ³2 |
| 1 | A | C | F | 0.3 | 0.1 | 0.5 | >120 | 120 | 1 |
| 14 | A | C | G | 0.3 | 0.1 | 0.5 | >120 | 120 | 1 |
| 15 | B | C | F | 0.3 | 0.1 | 0.5 | >120 | 96 | 1 |
| 16 | B | E | | 1.0 | 0.5 | | 60 | 24 | 4 |
| 17 | B | H | | 1.0 | 1.5 | | 60 | 24 | ¹2 |
| 18 | B | E+H | | 1.0 | 0.5/1.5 | | 60 | 24 | ¹2 |

¹ Characteristic number after 96 hours—4.
² Characteristic number after 96 hours—2.
³ Characteristic number after 96 hours—3.

NOTE.—The datum "more than 120" means that at the end of 120 minutes at 240° C. the stabilized polymer does not yet show any red-brown discoloration, i.e., the characteristic number 7 has not occurred yet. The letters used have the following meaning:
A=Sorbitol; B=Tripentaerythritol; C=4,4'-dihydroxytetraphenylmethane; D=2,2'-bis-(4-hydroxyphenyl)-propane; E=2,6-di-tert-butyl-p-cresol; F=2,4-dihydroxybenzophenone; G=2,2',4,4'-tetrahydroxybenzophenone; H=Tridecylphosphite.

The homopolymers and copolymers of vinyl fluoride used in the examples were made by polymerizing appropriate monomers in an autoclave in an aqueous dispersion using azoisobutyramidinehydrochloride as catalyst in the presence of 0.02% of ethyl iodide related to vinyl fluoride monomer at temperatures of 75 to 80° C. and an initial pressure of approximately 200 atmospheres. The intrinsic viscosity (ml./g.) was determined in solutions of the polymer in hexamethyl/phosphorus triamide at 65° C.

What is claimed is:

1. A stabilized composition of a fluorine-containing vinyl polymer stabilized against thermal oxidation and ultraviolet light degradation, said composition containing, as stabilizers therein, a polyol selected from the group consisting of pentaerythritol, dipentaerythritol, tripentaerythritol, sorbitol and mannitol; a polynuclear phenol selected from the group consisting of 4,4'-dihydroxydiphenyl methane, 4,4'-dihydroxytetraphenyl methane, 2,2'-bis-(4-hydroxyphenyl)-ethane, 2,2'-bis - 4 - hydroxyphenyl) - propane and a hydroxybenzophenone selected from the group consisting of 2,4 - dihydroxybenzophenone, 2 hydroxy - 4 - methoxybenzophenone, 2,2' - dihydroxy - 4 - methoxybenzophenone and 2,2'-4,4' - tetrahydroxybenzophenone, said polyol present in a proportion of about 0.15 to 1 weight percent, said polynuclear phenol present in a proportion of the composition in an amount of 0.5 weight percent based upon the weight of said fluorine-containing polymer and said fluorine containing polymer is polyvinyl fluoride.

5. A composition according to claim 3 wherein said polyol is tripentaerythyritol and is present in an amount of 0.3 weight percent, said polynuclear phenol is 4,4'-dihydroxytetraphenylmethane and is present in an amount of 0.1 weight percent based upon the weight of said fluorine-containing polymer and said hydroxybenzophenone is 2,4-dihydroxyphenone and is present in an amount of 0.5 weight percent based upon the weight of said fluorine containing polymer and fluorine-containing polymer is polyvinyl fluoride.

References Cited
UNITED STATES PATENTS 3,390,112    6/1968    Scullin et al. _____ 260—45.95
2,951,052    8/1960    Darby _____ 260—45.95

DONALD E. CZAJA, Primary Examiner

V. P. HOKE, Assistant Examiner

U.S. Cl. X.R.

260—45.95 F, 45.95 L

UNITED STATES PATENT OFFICE

CERTIFICATE OF CORRECTION

Patent No. 3,779,985        Dated December 18, 1974

Inventor(s) Günther Heuser, Gregor Weisgerber and Erich Behr

It is certified that error appears in the above-identified patent and that said Letters Patent are hereby corrected as shown below:

<u>Colums 5 & 6, in the Table</u>

In the last column "2-3" should have footnote 1

Signed and sealed this 15th day of October 1974.

(SEAL)
Attest:

McCOY M. GIBSON JR.        C. MARSHALL DANN
Attesting Officer           Commissioner of Patents